UNITED STATES PATENT OFFICE

2,630,428

PREPARATION OF INSOLUBLE QUATERNARY AMMONIUM ALKOXIDES

Jesse C. H. Hwa, Philadelphia, Pa., assignor to Rohm & Haas Company, Philadelphia, Pa., a corporation of Delaware No Drawing. Application October 5, 1951, Serial No. 250,038

13 Claims. (Cl. 260—86.7)

This invention relates to resinous quaternary ammonium alkoxides and to a method for their preparation. It relates to quaternary ammonium alkoxides which are polymeric and are insoluble in organic liquids. It relates to resinous products which are particularly useful as insoluble and easily separable catalysts for many organic chemical reactions.

This invention also provides a method of preparing such insoluble alkoxides; and the process comprises reacting under substantially anhydrous conditions an alcohol and a tertiary amine with an insoluble, cross-linked polymer of a glycidyl ester of acrylic acid or of an alpha-substituted acrylic acid such as alpha-methylacrylic acid.

The process can be better understood from a consideration of a preferred embodiment of this invention; namely, the preparation of an insoluble, resinous, quaternary ammonium alkoxide by the reaction of trimethylamine and ethanol with a cross-linked polymer of glycidyl methacrylate:

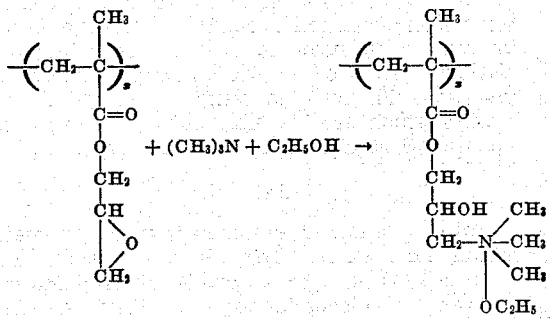

The character $x$ is employed in the conventional way to indicate that the structural unit shown is only one of many such units joined together in the polymeric glycidyl ester.

The scope of the invention is indicated by the following representation:

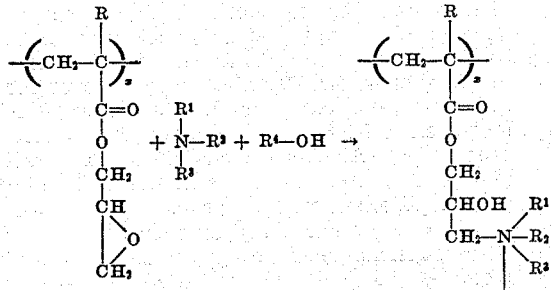

In the above, R represents an atom of hydrogen or an atom of chlorine or an alkyl group of one to four carbon atoms; $NR^1R^2R^3$ represents a tertiary amine, preferably one in which the R-groups are hydrocarbon groups such as alkyl groups; and $R^4$—OH represents a monohydric alcohol.

It is to be noted that the oxirane rings of the polymeric glycidyl ester open during the reaction but that the rest of the macromolecule including the group R remains inert and intact. In like manner the groups on the tertiary amino nitrogen atom are not altered; and all that is required of the amine is that it be a tertiary amine, in which case quaternary ammonium groups become attached to the insoluble macromolecules. Also the group $R^4$ of the alcohol is not disrupted during the reaction.

The monomeric glycidyl esters which are polymerized, cross-linked and then reacted with a tertiary amine and an alcohol to produce the insoluble, resinous, quaternary ammonium alkoxides of this invention include the glycidyl esters of acrylic acid, alpha-chloroacrylic acid, alpha-methylacrylic acid, alpha-ethylacrylic acid, the isomeric alpha-propylacrylic acids and the isomeric alpha-butylacrylic acids. The monomeric esters are known and are ordinarily prepared by reacting a salt of the acid with epichlorohydrin, for example, according to the method of U. S. Patent No. 2,537,981 of January 16, 1951.

The glycidyl esters are polymerized together with a cross-linking agent so as to produce insoluble polymeric products. Cross-linking agents are well known and embrace those compounds which are copolymerizable with the glycidyl esters and which contain a plurality of non-conjugated vinylidene groups, $CH_2=C<$. Currently, divinylbenzene is the most common cross-linking agent but others which are operable include diallyl esters of polycarboxylic acids, e. g., diallyl phthalate, diallyl succinate, and diallyl maleate; vinyl esters of polycarboxylic acids, e. g., divinyl sebacate; and polyvinyl hydrocarbons such as divinylnaphthalene, trivinylbenzene, trivinylnaphthalene, and polyvinylanthracenes.

By varying the amount of the cross-linking agent used in the preparation of the copolymer, variations can be made in the physical properties of the polymeric material which carry through to the finished product. Thus, for example, higher amounts of cross-linker make for products of higher density. In general, the amount of copolymerizable cross-linking agent can vary from 0.1 % to 40% of the total polymerizable materials on a molar basis. In practice, however, it is preferred to use at least 0.5%; and for most purposes no benefit is derived from using over about 10%.

The polymeric base material can be formed by any of the known polymerization processes such as polymerization in mass, in solvents for the monomeric materials or in emulsion or suspension in a liquid which is not a solvent for the monomers. The last is the preferred method because it produces the polymer in the form of small spheroids or beads, the size of which can be regulated and controlled.

The polymerization of the glycidyl ester and the copolymerizable cross-linking agent is accelerated by means of well known catalysts. These catalysts include ozone; ozonides; organic peroxidic compounds such as acetyl peroxide, lauroyl peroxide, stearoyl peroxide, tert.-butyl hydroperoxide, benzoyl peroxide, tert.-butylperbenzoate, di-tert.-butyl diperphthalate, di-tert.-butyl peroxide, and the barium salt of tert.-butyl hydroperoxide; inorganic agents such as barium peroxide, sodium peroxide, hydrogen peroxide; and the so-called "per salts" such as the water-soluble perborates, persulfates, and perchlorates. The catalysts are employed in suitable amounts ranging from 0.1% to about 2.0% based on the weight of the monomeric material to be polymerized.

Tertiary amines which react with the cross-linked and insoluble glycidyl esters are best represented, as above, by the general formula

in which $R^1$, $R^2$, and $R^3$ represent organic radicals. Those amines are preferred in which the organic groups attached to the nitrogen atoms are unsubstituted hydrocarbon groups. But it is also true that other amines can be used wherein the hydrocarbon radical of the amine carries a substituent group, such as a hydroxyl group, as in N,N-dimethylethanolamine, or another amino nitrogen atom as in tetramethyldiaminoethane. The portions of the tertiary amines which are represented by $R^1$, $R^2$ and $R^3$ above can be aliphatic, aromatic, cycloaliphatic, araliphatic, and alkaromatic. These groups are not altered during the reaction of the amine with the polymeric glycidyl ester. Satisfactory amines are typified by the following: Trimethylamine, triethylamine, tripropylamines, tributylamines, dimethylbenzylamine, dibenzylmethylamine, dimethylaniline, benzylphenylmethylamine, N,N-dimethylethanolamine, N-methyldiethanolamine, triethanolamine, and the like.

The alcohols which are employed are preferably the alkanols containing one to eight carbon atoms. The rate of reaction decreases with the molecular size of the alcohol and consequently methanol and ethanol are preferred. Examples of the other operable alcohols include isopropyl, n-butyl, sec-butyl, tert.-butyl, isoamyl, 2-ethylhexyl and benzyl alcohols and their homologues and isomers. It should be pointed out that while the alkoxides of lower aliphatic, monohydric alcohols are preferred because they are cheaper and are more readily prepared, the corresponding alkoxides of ethylene glycol and glycerol have been made and these are like the alkoxides of the monohydric alcohols so far as their catalytic activity and their reactivity with water are concerned.

The reaction of the resin with the tertiary amine and alcohol is best carried out by suspending the cross-linked glycidyl ester, in the form of small particles, in a mixture of the amine and an excess of the alcohol. The mixture is then agitated and maintained at a temperature from about −5° C. to about 100° C. or up to the refluxing point of the mixture. Since some decomposition occurs at the higher temperatures and since the reaction is sluggish below normal room temperatures, it is much preferred to carry out the reaction within the temperature range of about 20° C. to about 80° C. On a large scale the reaction is best carried out in a closed system. The ratios of reactants can vary but it is preferred to employ an excess of amine and alcohol over the polymeric glycidyl ester. At the conclusion of the reaction the insoluble, resinous alkoxide is separated from the reaction mixture by decantation, filtration, or the like and is preferably stored while moistened with the alcohol which was used in its preparation.

The products of this invention are quaternary ammonium alkoxides; and as such they resemble in their catalytic activity the alkoxides of the alkali metals, such as potassium methoxide or sodium ethoxide. They do have an advantage, however, over the latter in that they are insoluble in organic liquids and in organic reaction mixtures and can, therefore, be easily and mechanically separated therefrom. When these alkoxides are brought into contact with water, they are hydrolyzed; and the quaternary ammonium alkoxide groups are changed into quaternary ammonium hydroxide groups. This susceptibility to hydrolysis accounts for the maintenance of substantially anhydrous conditions during the preparation of the quaternary ammonium alkoxides. The resultant quaternary ammonium resins are strongly basic and are excellent for the adsorption of anions from solutions. The preparation of such anion-exchange resins by a more direct method is the subject of my application for Letters Patent, Serial No. 250,037, filed October 5, 1951.

The following example, in which all parts are by weight, serves to illustrate the process of this invention which in its broader aspects is a method of converting insoluble, cross-linked polymers of glycidyl esters of acrylic and alpha-substituted acrylic acids into quaternary ammonium alkoxides which are insoluble but which are excellent catalysts for many organic reactions.

*Example*

Into a container equipped with thermometer, mechanical stirrer, and reflux condenser were poured 1950 parts of water containing 0.5% of a commercial dispersing agent. To this stirred solution was added a mixture of 620 parts of monomeric glycidyl methacrylate, 20 parts of divinylbenzene, 20 parts of ethylstyrene and 6.5 parts of benzoyl peroxide. The mixture was stirred for ten minutes at room temperature after which it was heated to 90° C. and held there for 1.5 hours. The mixture was then filtered and the hardened, insoluble beads of polymeric glycidyl methacrylate were washed thoroughly with water and then dried overnight in an oven at 65° C. The beads were uniform, individual and hard and had an average estimated size of 0.2 mm. diameter. The described process is particularly good for the preparation of insoluble, cross-linked polymers of all of the glycidyl esters described above.

Into a container equipped with a mechanical stirrer, thermometer, and gas-inlet tube were introduced 74 parts of the dried, cross-linked, polymeric glycidyl methacrylate prepared above and 150 parts of anhydrous methanol. The mixture was stirred at room temperature for one hour. Then 35.4 parts of gaseous trimethylamine was added slowly to the reaction mixture which was maintained at room temperature. The gas-inlet tube was then replaced by a reflux condenser to which a calcium chloride drying tube was attached. The reaction mixture was warmed to 40° C. in three-quarters of an hour and then was stirred and maintained at 40°–50° C. for eight hours. After cooling, the mixture was filtered and the separated resin was washed free of amine with anhydrous methanol. The major portion was bottled wet with alcohol and the remainder was dried overnight in an oven at 65° C. The resulting resinous quaternary methoxide remained in the form of small beads and contained 4% nitrogen by anaylsis.

Other quaternary alkoxides were made in the same way by merely substituting another alcohol, preferably ethanol, for the methanol and other tertiary amines described above for the trimethylamine.

Some of the dried product of this example was stirred for four hours in an excess of a 4% aqueous solution of sodium chloride. Titration with standard hydrochloric acid showed that the resinous product had hydrolyzed to a material containing quaternary ammonium hydroxide groups and that these hydroxyl groups had replaced some of the chloride ions in solution. Thus, the product had a quaternary ammonium anion-exchange capacity of 2.85 milli-equivalents per gram. It was then treated for four hours with a 4% aqueous solution of sodium hydroxide during which time the polar quaternary ammonium groups were converted to the hydroxyl form. The resin was washed and then dried at 65° C. overnight.

This material containing the polar groups of the formula

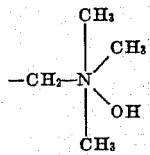

was compared as a catalyst with the original product of this invention which contained polar methoxide groups of the formula

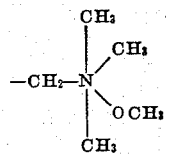

The same amount of each material was added to identical reaction mixtures of diethyl malonate and ethyl acrylate and the resultant mixtures were maintained under identical conditions at room temperature after which they were filtered and distilled. The yield of triethyl 1,1,3-propanetricarboxylate under the catalytic effect of the quaternary ammonium methoxide resin was almost three times as great as the yield obtained by the use of the quaternary ammonium hydroxide resin as catalyst.

When tetramethyldiaminoethane, $(CH_3)_2N—C_2H_4—N(CH_3)_2$ was employed in an equivalent amount in place of the trimethylamine of the above example, the product was a similar, insoluble, hydrolyzable quaternary ammonium alkoxide but was denser than the product of the above example. This increase in density was due to the additional cross-linkages in the resin resulting from the reaction of the epoxy groups in two units of the polymer with the two amino groups of the di-tertiary amine.

I claim:

1. A process for preparing insoluble, polymeric, quaternary ammonium alkoxides which comprises reacting at a temperature from —5° C. to refluxing temperature and under substantially anhydrous conditions a tertiary amine from the class consisting of trimethylamine, triethylamine, tripropylamines, tributylamines, dimethylbenzylamine, dibenzylmethylamine, dimethylaniline, benzylphenylmethylamine, N,N-dimethylethanolamine, N - methyldiethanolamine, triethanolamine, and tetramethyldiaminoethane and an alkanol containing one to eight carbon atoms with an insoluble, cross-linked resinous product which is a copolymer of a mixture containing (a) 90%–99.5% of a glycidyl ester having the general formula

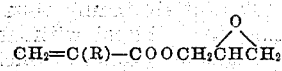

in which R represents a member of the class consisting of a hydrogen atom, a chlorine atom, and alkyl groups containing one to four carbon atoms, and (b) 0.5%–10% of a compound which is copolymerizable with said ester and which contains two to three non-conjugated vinylidene groups, $CH_2=C<$.

2. A process for preparing insoluble, polymeric, quaternary ammonium alkoxides which comprises reacting at a temperature from 20° C. to 80° C. and under substantially anhydrous conditions a tertiary amine from the class consisting of trimethylamine, triethylamine, tripropylamines, tributylamines, dimethylbenzylamine, dibenzylmethylamine, dimethylaniline, benzylphenylmethylamine, N,N - dimethylethanolamine, N-methyldiethanolamine, triethanolamine, and tetramethyldiaminoethane and an alkanol containing one to eight carbon atoms with an insoluble, cross-linked resinous product which is a copolymer of a mixture containing (a) 90%–99.5% of a glycidyl ester having the general formula

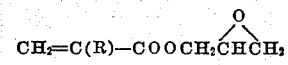

in which R represents a member of the class consisting of a hydrogen atom, a chlorine atom, and alkyl groups containing one to four carbon atoms, and (b) 0.5%–10% of a compound which is copolymerizable with said ester and which contains two to three non-conjugated vinylidene groups, $CH_2=C<$.

3. A process of preparing insoluble, polymeric, quaternary ammonium alkoxides which comprises reacting at a temperature from 20° C. to 80° C. and under substantially anhydrous conditions trimethylamine and methanol with an insoluble, cross-linked, resinous product which is a copolymer of a mixture containing 90%–99.5% of glycidyl methacrylate and 0.5%–10% of divinylbenzene.

4. A process of preparing insoluble, polymeric, quaternary ammonium alkoxides which comprises reacting at a temperature from 20° C. to 80° C. and under substantially anhydrous conditions trimethylamine and methanol with an insoluble, cross-linked, resinous product which is a copolymer of a mixture containing 90%–99.5% of glycidyl acrylate and 0.5%–10% of divinylbenzene.

5. A process of preparing insoluble, polymeric, quaternary ammonium alkoxides which comprises reacting at a temperature from 20° C. to 80° C. and under substantially anhydrous conditions trimethylamine and ethanol with an insoluble, cross-linked, resinous product which is a copolymer of a mixture containing 90%–99.5% of glycidyl acrylate and 0.5%–10% of divinylbenzene.

6. A process of preparing insoluble, polymeric, quaternary ammonium alkoxides which comprises reacting at a temperature from 20° C. to 80° C. and under substantially anhydrous conditions dimethylaminoethanol and methanol with an insoluble, cross-linked, resinous product which is a copolymer of a mixture containing 90%–99.5% of glycidyl methacrylate and 0.5–10% of divinylbenzene.

7. A process of preparing insoluble, polymeric, quaternary ammonium alkoxides which comprises reacting at a temperature from 20° C. to 80° C. and under substantially anhydrous conditions trimethylamine and ethanol with an insoluble, cross-linked, resinous product which is a copolymer of a mixture containing 90%–99.5% of glycidyl methacrylate and 0.5%–10% of divinylbenzene.

8. An insoluble, polymeric, quaternary ammonium alkoxide as prepared by the process of claim 2.

9. An insoluble, polymeric, quaternary ammonium alkoxide as prepared by the process of claim 3.

10. An insoluble, polymeric, quaternary ammonium alkoxide as prepared by the process of claim 4.

11. An insoluble, polymeric, quaternary ammonium alkoxide as prepared by the process of claim 5.

12. An insoluble, polymeric, quaternary ammonium alkoxide as prepared by the process of claim 6.

13. An insoluble, polymeric, quaternary ammonium alkoxide as prepared by the process of claim 7.

JESSE C. H. HWA.

REFERENCES CITED

The following references are of record in the file of this patent:

UNITED STATES PATENTS

| Number | Name | Date |
| --- | --- | --- |
| 2,606,810 | Erickson | Aug. 12, 1952 |